United States Patent [19]

Murata

[11] Patent Number: 5,378,526
[45] Date of Patent: Jan. 3, 1995

[54] ELASTIC MEMBER FOR ELECTROPHOTOGRAPHY

[75] Inventor: Jun Murata, Kawagoe, Japan

[73] Assignee: Canon Kabushiki Kaisha, Tokyo, Japan

[21] Appl. No.: 224,130

[22] Filed: Apr. 6, 1994

Related U.S. Application Data

[63] Continuation of Ser. No. 530,187, May 25, 1990, abandoned.

[30] Foreign Application Priority Data

May 26, 1989 [JP] Japan .................................. 1-133800

[51] Int. Cl.$^6$ ........................ B32B 7/02; G03G 15/16
[52] U.S. Cl. .................................... 128/214; 428/466; 428/906; 355/219; 355/271; 358/300
[58] Field of Search ........................ 428/214, 466, 906; 355/219, 271; 358/300

[56] References Cited

U.S. PATENT DOCUMENTS

| | | | |
|---|---|---|---|
| 3,925,271 | 12/1975 | Balinth | 524/292 |
| 4,257,699 | 3/1981 | Lentz | 355/3 FU |
| 4,264,181 | 4/1981 | Lentz et al. | 355/3 FU |
| 4,272,179 | 6/1981 | Seanor | 355/3 FU |
| 4,379,630 | 4/1983 | Suzuki | 355/3 TR |
| 4,489,148 | 12/1984 | Horgen | 439/59 |
| 4,522,866 | 6/1985 | Nishikawa | 428/216 |
| 4,701,279 | 10/1987 | Kawaguchi et al. | 252/511 |
| 5,035,950 | 7/1991 | Del Rosario | 428/421 |

FOREIGN PATENT DOCUMENTS 58-202468 11/1983 Japan .

*Primary Examiner*—Roland Martin
*Attorney, Agent, or Firm*—Fitzpatrick, Cella, Harper & Scinto

[57] ABSTRACT

An elastic member for electrophotography including an electroconductive substrate, and a semiconducting elastic layer bonded to the electroconductive substrate by the medium of a rubber-type electroconductive adhesive layer.

12 Claims, 2 Drawing Sheets

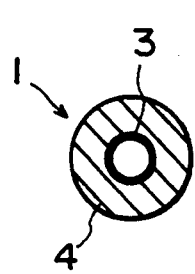
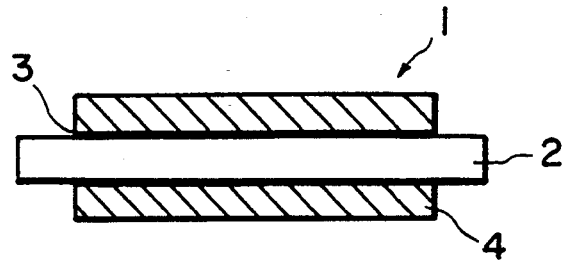
FIG. 1A    FIG. 1B
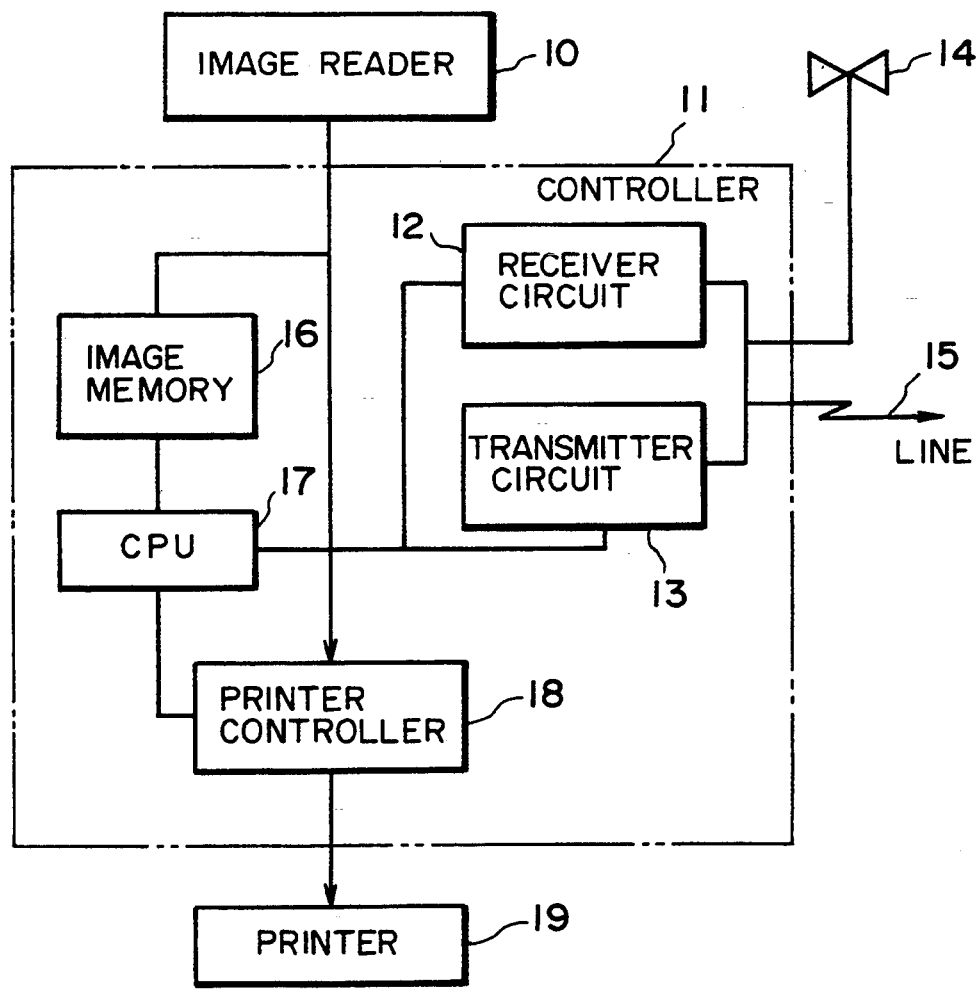
FIG. 2

ELASTIC MEMBER FOR ELECTROPHOTOGRAPHY

This application is a continuation of application Ser. No. 07/530,187 filed May 25, 1990, now abandoned.

FIELD OF THE INVENTION AND RELATED ART

The present invention relates to an elastic (or elastomeric) member for electrophotography, particularly to an elastic member for electrophotography such as transfer member and charging member to be used for electrophotographic apparatus such as copying machine and laser-beam printer.

In the field of an electrophotographic elastic member, various techniques have heretofore been proposed with respect to resistance control of semiconducting materials, and electroconductive adhesive have been used as the adhesive to be disposed between the semiconducting material and a metal core.

However, the adhesive to be used for such a purpose can effect the semiconducting property of the elastic material depending on the resistivity thereof. For example, if such an elastic member is used as a transfer member, it causes a problem in that the resultant transfer efficiency to a transfer material (or transfer-receiving material) is decreased, and uniform and good transfer performances cannot be obtained.

In order to solve the above-mentioned problem, vulcanizable electroconductive adhesive have been used in most cases, as described in Japanese Laid-Open Patent Application (JP-A, KOKAI) No. 202468/1983.

However, when an elastic member is used as an elastic roller such as transfer roller and charging roller, a load is applied to the interface between the rigid metal core and elastic semiconducting layer on the basis of shear force due to contact pressure and rotation. In such a case, according to my investigation, when the electroconductive layer and the metal core are bonded to each other by using a vulcanizable adhesive, the rigidity after the bonding is strong, and peeling can occur at the interface to increase the resistivity of the roller during a long-term use of the resultant roller. Alternatively, the roller may have different resistivities corresponding to different portions thereof. The above-mentioned problem can also be present in the case of a plate-type elastic member.

In general, elastic rollers may be prepared by pressing a metal core in a preliminarily vulcanized tube to be formed into a roller-like shape and then grinding the resultant product. When the above-mentioned vulcanizable adhesive is used in this type of process, the adhesive force thereof is weak and the durability thereof is little. Accordingly, the same problem as described above can also be present in this case.

SUMMARY OF THE INVENTION

An object of the present invention is, in view of the above-mentioned problems, to provide an elastic (or elastomeric) member for electrophotography comprising a semiconducting elastic (or elastomeric) layer and a conductive substrate such as metal core which are well bonded to each other.

Another object of the present invention is to provide an elastic member for electrophotography which is capable of providing uniform semiconducting property on the surface thereof regardless of surface positions.

A further object of the present invention is to provide an elastic member for electrophotography which is excellent in durability.

A still further object of the present invention is to provide an electrophotographic apparatus equipped with the above-mentioned elastic member for electrophotography.

According to the present invention, there is provided an elastic member for electrophotography comprising: an electroconductive substrate, and a semiconducting elastic layer bonded to the electroconductive substrate by the medium of a rubber-type electroconductive adhesive layer.

The present invention also provides an electrophotographic apparatus comprising an electrophotographic photosensitive member and an elastic member disposed in contact with the photosensitive member, wherein the elastic member comprises an electroconductive substrate, and a semiconducting elastic layer bonded to the electroconductive substrate by the medium of a rubber-type electroconductive adhesive layer.

The present invention further provides a facsimile comprising an electrophotographic apparatus and receiving means for receiving image information from a remote terminal; the electrophotographic apparatus comprising an electrophotographic photosensitive member and an elastic member disposed in contact with the photosensitive member, wherein the elastic member comprises an electroconductive substrate, and a semiconducting elastic layer bonded to the electroconductive substrate by the medium of a rubber-type electroconductive adhesive layer.

In the present invention, when a unvulcanizable rubber-type electroconductive adhesive is used, it shows a rubber-like elasticity even after vulcanization of the semiconducting rubber layer Accordingly, even when a shear force produced by rotation and/or contact under pressure is exerted on the boundary between the semiconducting elastic layer and the conductive substrate such as metal core, the shear force is relaxed and dispersed by the adhesive layer having an elasticity, and the adhesive layer may thus be prevented from peeling as may result thereof which can occur on from stress concentration. As a result, the elastic member according to the present invention may be free from unevenness or variation in resistivity based on the prevention of above-mentioned peeling.

In the present invention, good bonding strength property between the conductive substrate and the semiconducting elastic layer may be provided on the basis of the rubber-type adhesive, whereby good adhesion property and uniform electroconductivity may be obtained.

In addition, since the rubber-type electroconductive adhesive can be bonded to a semiconducting elastic material which has already been vulcanized, the scope of selection of production processes may be broadened. Accordingly, in the present invention, a roller-type elastic member may be produced by pressing a conductive substrate such as metal core in a tube which has already been vulcanized.

Further, in the present invention, since the above-mentioned rubbery material is used as a binder, electroconductive filler may easily be mixed therein. As a result, a large amount of the filler can be mixed in the binder, and various fillers having different resistivities can arbitrarily be added thereto.

BRIEF DESCRIPTION OF THE DRAWINGS

FIGS. 1A and 1B are schematic sectional views showing cross sections of an embodiment of the electrophotographic elastic member according to the present invention in lateral and longitudinal directions with respect to the axis direction of the elastic member, respectively;

FIG. 2 is a block diagram showing a facsimile machine using the electrophotographic apparatus containing the electrophotographic elastic member according to the present invention as a printer.

DETAILED DESCRIPTION OF THE INVENTION

Figure 3:
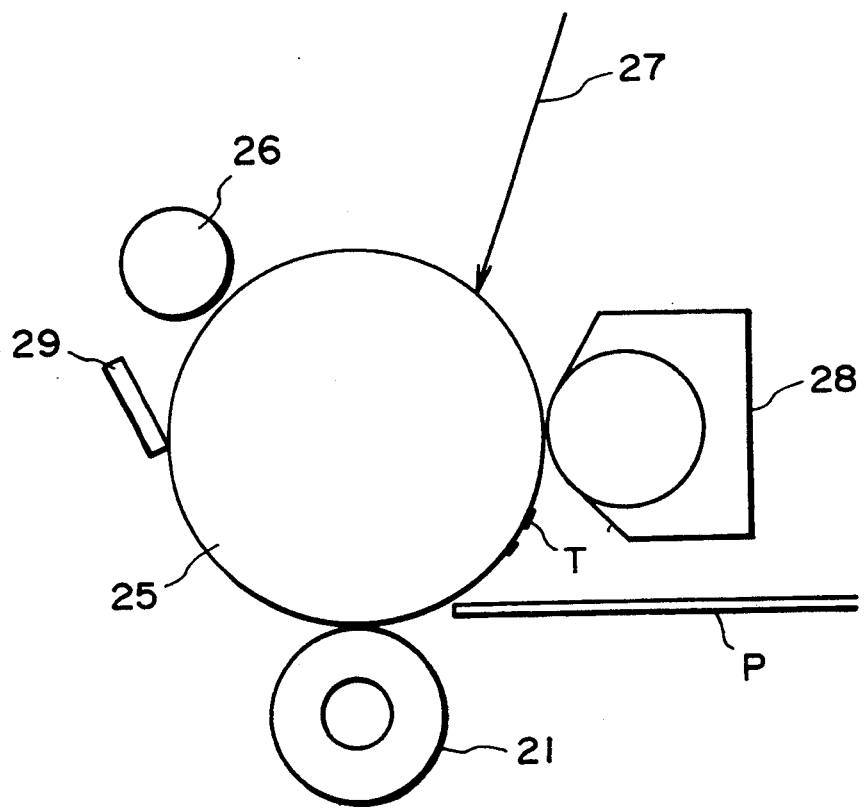
FIG. 3 is a schematic sectional view showing an embodiment of the electrophotographic apparatus according to the present invention.

FIGS. 1A and 1B show a basic embodiment of the roller-type electrophotographic elastic member according to the present invention. Referring to FIGS. 1A and 1B, the elastic member 1 in this embodiment comprises a cylindrical electroconductive substrate 2 such as metal core, and a rubber-type electroconductive adhesive layer 3 and a semiconducting elastic layer 4 disposed in this order on the substrate 2.

The rubber-type electroconductive adhesive layer 3 of the elastic member 1 may preferably have a thickness of 0.5 micron to 1 mm, more preferably 0.5 micron to 0.5 mm. In the present invention, the electroconductive adhesive layer 3 may comprise an electroconductive adhesive, and may preferably have a resistivity of $10^3$ ohm.cm or below, and/or an elasticity modulus of $10^{-1}$ to $10^1$ MPa (mega-pascal, pascal=$N/m^2$).

In the present invention, the electroconductive adhesive layer 3 may comprise an elastomer such as rubber and electroconductive filler contained therein, as desired. When carbon black is used as electroconductive filler in the electroconductive adhesive layer 3, it has various advantages such that it is inexpensive, can easily be dispersed in the layer, and is hardly sedimented during the storage of the adhesive (i.e., pot-life). In order to obtain good and uniform electroconductivity, the electroconductive filler content may preferably be 10-35 wt. % based on the total weight of the rubber-type electroconductive adhesive layer 3. Carbon black may particularly preferably be used as the electroconductive filler, but other powders such as metal powder and graphite can also be used as the filler.

In order to form a rubber-type electroconductive adhesive layer 3 having a rubber-like elasticity, the rubber or elastomer constituting the rubber-type electroconductive adhesive layer 3 may preferably comprise an unvulcanizable rubber. Preferred example of such a rubber may include: chloroprene-type rubbers, silicone-type rubbers, nitrile-butyl rubbers, isoprene-type rubbers, urethane-type rubbers, natural rubbers, acrylic-type rubbers, styrene-butadiene rubbers, and blends of these rubbers. Among these, chloroprene-type rubber is particularly preferred. This is because the resultant chloroprene rubber-type adhesive is excellent in heat-resistance, ozone-resistance and aging resistance. It also has an advantage such that when it is applied onto both surface of adherends and dried to a certain extent and these surfaces are caused to contact each other, they can be simultaneously bonded. Further, even when the chloroprene rubber-type adhesive is applied onto only one of the adherend surfaces, these surfaces can be bonded to each other by causing them to contact each other and heating the resultant superposition. Accordingly, when the chloroprene rubber-type adhesive is used, a metal member and a member of vulcanized rubber, plastic, etc. can easily be bonded to each other.

The shape or form of the elastic member according to the present invention may for example be a roller, a blade, etc., and may appropriately be selected corresponding to the specification and/or form of an electrophotographic apparatus using it.

In an embodiment wherein the elastic member has a blade form, such an elastic member may comprise an electroconductive substrate in the form of a plate, and a semiconducting elastic layer bonded thereto by the medium of a rubber-type electroconductive adhesive layer.

The electroconductive substrate 2 such as core may comprise a metal or metal alloy such as iron, copper and stainless steel.

In the present invention, the semiconducting elastic layer 4 may preferably have a thickness of 0.5 mm–10 mm, more preferably 2 mm–8 mm. The semiconducting elastic layer 4 may comprise an elastic (or elastomeric) material such as resin or elastomer (inclusive of rubber) matrix, and an electroconductive filler dispersed therein such as electroconductive carbon, graphite and metal powder. It is particularly preferred to use a double oxide as the electroconductive filler.

The double oxide used in the present invention refers to a compound of higher order (i.e., a compound formed by an intermolecular bond) comprising at least two species of oxides, i.e., a metal oxide wherein at least two species of metals are co-present. The double oxide may be produced, e.g., by dispersing one or more kind of different species of metal ions in a crystal lattice of another metal oxide, and baking or calcining the resultant product in a reducing atmosphere. For example, a double oxide comprising zinc oxide and aluminum oxide is prepared by treating zinc oxide and an aluminum salt in an aqueous ammonium salt solution, dehydrating the resultant product and then baking it in an atmosphere of hydrogen, as described in Japanese Patent Publication (JP-B, KOKOKU) No. 41171/1987.

Accordingly, the above-mentioned double oxide is different than a simple metal oxide. Specific examples of such a double oxide may include: solid solution compounds comprising zinc oxide (ZnO) and aluminum oxide ($Al_2O_3$); solid solution compounds comprising tin oxide ($SnO_2$) and antimony oxide ($Sb_2O_5$); solid solution compounds comprising indium oxide ($In_2O_3$) and tin oxide ($SnO_2$); solid solution compounds comprising zinc oxide (ZnO) and titanium oxide ($Ti_2O_3$); solid solution compounds comprising magnesium oxide (MgO) and aluminum oxide ($Al_2O_3$); solid solution compounds comprising iron oxide (FeO) and titanium oxide ($TiO_2$); etc.

Such a double oxide may be characterized in that the respective metals contained therein have similar atomic radii and constitute a substitutional solid solution, and their valences are different, whereby the double oxide provides an electroconductivity which cannot be provided by each metal oxide alone.

The above-mentioned double oxide may preferably have a specific resistance (or resistivity) of $10^1$ ohm.cm to $10^3$ ohm.cm, which is higher than that of electroconductive carbon black, reinforcing carbon black, ruthenium oxide, etc. (i.e., $10^{-2}$ ohm.cm to $10^0$ ohm.cm); and is lower than that of tri-iron tetroxide, tin oxide, etc. (i.e., $10^4$ ohm.cm or higher).

When the filler comprising a double oxide having a specific resistance of $10^1$ to $10^3$ ohm.cm is used, a stable semiconducting property may be provided by using an addition amount which causes substantially no problem in physical properties, whereby the resultant semiconducting material is excellent in reproducibility and stability in mass-production.

Among the above-mentioned double oxides, $ZnO$—$Al_2O_3$ is particularly preferred from some reasons such that: the filler comprising such a double oxide may provide a specific resistance of $10^2$ to $10^3$ ohm.cm which is nearest to an ideal value in view of resistance stability in a semiconductive region; it may easily be dispersed in a polymer dispersion medium such as resin and rubber, and the resultant dispersion is excellent in moldability; it may be produced at a low cost; an appropriate resistance value may be obtained by changing the doping amount of Al (or $Al_2O_3$); etc.

The double oxide content may preferably be 5–40 wt. %, more preferably 10–30 wt. %, based on the total weight of the semiconducting elastic layer 4.

Specific examples of the elastic (or elastomeric) material constituting the semiconducting elastic layer may include: rubbers such as EPDM (ethylene-propylene-diene terpolymer), polybutadiene, natural rubbers, polyisoprene, SBR (styrene-butadiene rubber), CR (chloroprene rubber), NBR (nitrile-butadiene rubber), silicone rubber, urethane rubber, and epichlorohydrin rubber; thermoplastic elastomers including RB (butadiene rubber), polystyrene-type such as SBS (styrene-butadiene-styrene elastomer), polyolefine-type, polyester-type, polyurethane-type and polyvinyl chloride; and polymer materials such as polyurethane, polystyrene, polyethylene, polypropylene, polyvinyl chloride, acrylic resins, styrene-vinyl acetate copolymers, and butadiene-acrylonitrile copolymers.

The elastic material may be used in the form of either a foam (or foamed material) or a solid rubber. Among the above-mentioned materials, a vulcanizable rubber is particularly preferred.

Further, another additive may be added to the elastic material as desired. Specific examples thereof may include: a reinforcing agent, an insulating oil, and another filler.

The semiconducting elastic layer 4 may preferably have an electric resistance of $10^4$ to $10^{10}$ ohm, in terms of the resistance of from the electroconductive substrate to the surface of the semiconducting elastic layer per 1 $cm^2$ of the semiconducting elastic layer.

When a photosensitive member is charged by using the elastic member according to the present invention, a voltage may for example be externally applied to the elastic member disposed in contact with the photosensitive member, whereby the photosensitive member is charged.

In a system wherein a photosensitive member is charged by means of an elastic member disposed in contact therewith, the photosensitive member may be charged by means of the elastic member supplied with a voltage, presumably because discharge is effected through a slight gap or clearance between the photosensitive member and elastic member, i.e., a narrow wedge-like space outside the contact portion between the photosensitive member and elastic member. The elastic member is caused to contact the photosensitive member in order to provide and retain such a minute clearance.

The electrophotographic elastic member according to the present invention may be used for transfer, primary charging and discharging (or charge-removing). In addition, the elastic member may be used for conveying, e.g., as a paper-feeding roller, etc. In the prior art, a problem has been encountered such that a portion of a transfer material contacting a conveying roller is charged by friction between the conveying roller and the transfer material, and charging unevenness occurs in the transfer material per se, thereby to causing unevenness in the resultant image. The above-mentioned material according to the present invention may be used as a means for solving such a problem.

The photosensitive member to be used in combination with the elastic member according to the present invention may include various photosensitive members comprising an OPC (organic photoconductor), a-Si, (amorphous silicon), Se, ZnO, etc.

The elastic member according to the present invention may be used for electrophotographic apparatus including ordinary copying machines, and apparatus relating to electrophotography such as laser-beam printers, LED printers and electrophotographic plate-making system.

FIG. 3 is a schematic sectional view showing an electrophotographic apparatus, wherein the elastic member according to the present invention is used as a elastic member for transfer operation.

Referring to FIG. 3, the electrophotographic apparatus in such an embodiment may comprise: a cylindrical photosensitive member 25, and around the peripheral surface of the photosensitive member 25, a charging roller 26 as a primary charger, an image exposure means (not shown) for providing a laser light beam 27 to form a latent image on the photosensitive member 25, a developing device 28 for developing the latent image with a toner or developer (not shown) to form a toner image T on the photosensitive member 25, a transfer elastic roller 21 for transferring the toner image T from the photosensitive member 25 onto a transfer-receiving material (or transfer material) P such as paper, and a cleaner 29 for removing a residual toner. In FIG. 3, the above-mentioned charging roller 26, image exposure means for providing the light beam 27, developing device 28, transfer charging roller 21, and cleaner 29 are disposed in this order along the peripheral surface of the photosensitive member 25 with respect to the moving direction of the photosensitive member 25.

In the electrophotographic apparatus as shown in FIG. 3, the photosensitive member 25, which has been sensitized to near infrared rays, is uniformly charged negatively by a contact charging method by means of the charging roller 26, and then raster-scanned by the laser light 27 for image exposure which has been modulated according to an image signal so as to selectively decrease the potential of an image portion of the photosensitive member 25, whereby an electrostatic latent image is formed on the photosensitive member 25. The thus formed latent image is developed or visualized with a negatively chargeable toner contained in the developing device 28, thereby to form the toner image T on the photosensitive member 25.

Thereafter, the toner image T is transferred from the photosensitive member 25 onto the transfer material P by means of the roller-form transfer elastic member 21 to which a positive voltage is applied. The transfer material P to which the toner image T has been transferred is then conveyed to a fixing device (not shown)

so that the toner image T is permanently fixed to the transfer material P.

The residual toner which remains on the photosensitive member 25 without transferring to the transfer material P at the time of the transfer operation is removed by means of the cleaner 29. Such an electrophotographic process may be repeated in the same manner as described above.

The apparatus relating to electrophotography as shown in FIG. 3 may be used as a printer for facsimile machine. FIG. 2 shows such an embodiment by using a block diagram.

Referring to FIG. 2, a controller 11 controls an image reader (or image reading unit) 10 and a printer 19. The entirety of the controller 11 is regulated by a CPU 17. Read data from the image reader 10 is transmitted through a transmitter circuit 13 to another terminal such as facsimile. On the other hand, data received from another terminal such as facsimile is transmitted through a receiver circuit 12 to a printer 19. An image memory 16 stores prescribed image data. A printer controller 18 controls the printer 19. In FIG. 2, reference numeral 14 denotes a telephone system.

Specifically, an image received from a line (or circuit) 15 (i.e., image information received from a remote terminal connected by the line) is demodulated by means of the receiver circuit 12, decoded by the CPU 17, and sequentially stored in the image memory 16. When image data corresponding to at least one page is stored in the image memory 16, image recording is effected with respect to the corresponding page. The CPU 17 reads image data corresponding to one page from the image memory 16, and transmits the decoded data corresponding to one page to the printer controller 18. When the printer controller 18 receives the image data corresponding to one page from the CPU 17, the printer controller 18 controls the printer 19 so that image data recording corresponding to the page is effected. During the recording by the printer 19, the CPU 17 receives another image data corresponding to the next page.

Thus, receiving and recording of an image may be effected by means of the apparatus shown in FIG. 2 in the above-mentioned manner.

The present invention will be explained in more detail with reference to examples.

EXAMPLE 1

A roller-type elastic member was prepared in the following manner by using a synthetic rubber-type electroconductive adhesive (Synthetic Rubber-type Electroconductive Adhesive No. 3315 mfd. by Three-Bond, carbon black content=30 wt. %) comprising chloroprene as a binder and carbon black as an electroconductive filler dispersed therein.

100 phr (parts per hundred parts of rubber or resin) of a $ZnO-Al_2O_3$ double oxide (Electroconductive Zinc Oxide 23K-S, mfd. by Hakusui Kagaku Kogyo K.K.) was added to 100 wt. parts of an EPDM (EPT 4045, mfd. by Mitsui Sekiyu Kagaku) and uniformly dispersed therein by means of a twin-roll device at room temperature to prepare material for forming a semiconducting elastic layer. The thus obtained material for semiconducting elastic layer was stable such that it had little variation in resistance, was free of resistance unevenness, and had molding reproducibility. The above-mentioned semiconducting elastic material was subjected to foaming by using a foaming agent and then vulcanized to be formed into a tube having an inside diameter of 5 mm, an outside diameter of 20 mm and a wall thickness of 7.5 mm.

More specifically, the forming agent used herein comprised 5 parts of a foaming agent (trade name: Cellmic C, mfd. by Sankyo Kasei) and 5 parts of a blowing promoter (trade name: Cellton NP, mfd. by Sankyo Kasei). The vulcanizing agent used herein comprised 2 parts of an accelerator "M" (trade name: Nocceler M, mfd. by Ouchi-Shinko Kagaku), 1 part of an accelerator "BZ" (trade name: Nocceler BZ, mfd. by Ouchi-Shinko Kagaku) and 2 parts of sulfur. The vulcanization was conducted by steam vulcanization (160° C., 30 min) by using steam heated up to 160° C. In this instance, the foaming occurred simultaneously with the vulcanization.

Separately, the above-mentioned adhesive was applied onto a metal core of stainless steel having a diameter of 6 mm and a length of 250 mm by means of a roll coater and then dried into a tack-free state to form a 0.1 mm-thick adhesive layer. The resultant metal core was inserted into the above-mentioned elastic tube and heated at 200° C. for 10 minutes by means of an oven. The surface of the resultant semiconducting elastic layer was subjected to grinding to prepare a roller-type elastic member having an outside diameter of 16 mm and having a semiconducting elastic layer with a length of 230 mm. The thus obtained elastic member had an electric resistance of $10^9$ ohm in terms of the resistance of from the metal core to the elastic member surface per unit area of 1 $cm^2$ of the elastic member.

The elastic member was assembled in an electrophotographic apparatus (laser-beam printer) as shown in FIG. 3 as an elastic member for transfer operation, and subjected to image formation evaluation.

The image formation was conducted under the following conditions:

Photosensitive member: OPC (organic photoconductor) drum (diameter=40 mm)
Dark part potential $(V_D)$: $-600$ V
Light part potential $(V_L)$: $-100$ V
Toner: one-component insulating magnetic toner
Development: Reversal development
Transfer material: copy paper (weight: 64 $g/m^2$)
Paper feed speed: 40 mm/sec.

The OPC photosensitive member 25 used herein was one prepared in the following manner.

A substrate was provided of an aluminum cylinder having a wall thickness of 0.5 mm, a diameter of 40 mm and a length of 260 mm. A coating liquid obtained by dissolving 4 parts of a copolymer nylon (trade name: CM-8000, mfd. by Toray K.K.) and 4 wt. parts of a nylon-8 (trade name: Luckamide 5003, mfd. by Dainihon Ink K.K.) in 50 parts of methanol and 50 parts of n-butanol was applied onto the substrate by dip coating to form a 0.6 micron-thick polyamide undercoat (or primer) layer.

Next, 10 parts of a disazo pigment represented by the following structural formula as a charge-generating substance, and 10 parts of a polyvinyl butyral resin (S-LEC BM2, mfd. by Sekisui Kagaku K.K.) as a binder resin were dispersed in 120 parts of cyclohexanone by means of a sand mill for 10 hours.

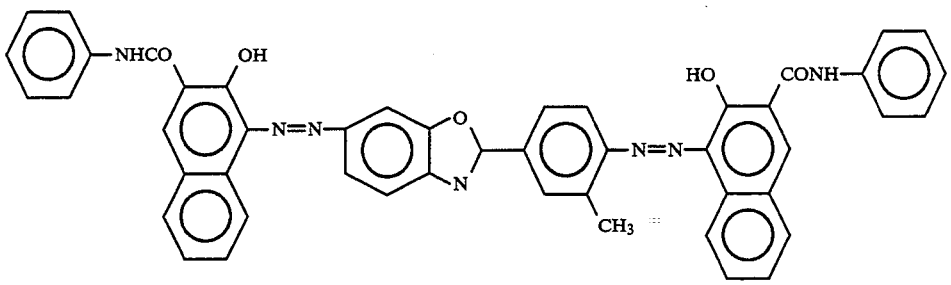

To the resultant dispersion, 30 parts of methyl ethyl ketone was added, and then the dispersion was applied onto the undercoat layer to form a 0.15 micron-thick charge generation layer.

Then, 10 parts of a hydrazone compound represented by the following structural formula as a charge-transporting substance, and 10 parts of a polycarbonate-Z resin (weight-average molecular weight of $12 \times 10^4$ mfd. by Mitsubishi Gas Kagaku K.K.) as a binder resin were dissolved in 80 parts of monochlorobenzene.

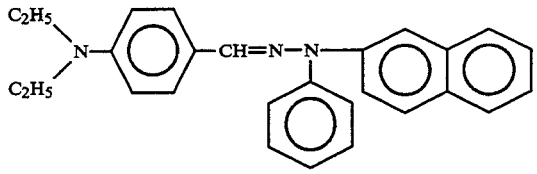

The resultant coating liquid was applied onto the above-mentioned charge generation layer to form a 18 micron-thick charge transport layer, whereby an OPC drum was prepared.

The charging roller 26 used herein comprised a metal core and an electroconductive rubber layer disposed thereon, which comprised an electroconductive polyurethane rubber having a resistance of $10^6$ ohm. The resistance used herein was a resistance of from the metal core to the roller surface, with respect to a roller surface area of 1 cm$^2$.

The charging roller 26 was constantly caused to contact the OPC drum 25 under a predetermined pressure (e.g., a line pressure of 0.01–0.2 kg/cm), and uniformly charged the photosensitive member 25 when supplied with a predetermined voltage. While a charging roller was used as a charging means in this instance, a conventional corona charger could also be used.

The resultant transfer performance in the initial stage was evaluated by using the above-mentioned electrophotographic apparatus. As a result, good and uniform transfer performances were obtained.

Further, a successive copying test (200,000 sheets) was conducted by using the above-mentioned apparatus. As a result, the semiconducting layer was not peeled from the metal core at the interface therebetween, and good and uniform transfer performances were obtained.

EXAMPLE 2

30 phr (parts per hundred parts of rubber) of electroconductive filler (Conductex 975, mfd. by Columbian Carbon Co.) and 20 phr of terpene resin (YS-Resin Px, mfd. by Yasuhara Yushi) were dispersed in 100 phr of chloroprene rubber (WM-1, mfd. by Showa Neoprene) containing a toluene solvent by means of a ball mill to prepare a rubber-type electroconductive adhesive having an electroconductive filler content of 28 wt. %.

A roller-type elastic member was prepared in the same manner as in Example 1 except for using the adhesive prepared above, and the resultant elastic member was evaluated in the same manner as in Example 1.

As a result, good and uniform transfer performances were obtained in the initial stage and during a successive copying test of 200,000 sheets.

EXAMPLE 3

15 phr of electroconductive filler (Ketjen Black EC, mfd. by Lion-Akzo) and 15 phr of phenolic resin (Sumilite Resin PR-12603, mfd. by Sumitomo Dules) were dispersed in 100 phr of NBR containing a methyl ethyl ketone (MEK) solvent by means of a ball mill to prepare a rubber-type electroconductive adhesive having an electroconductive filler content of 18 wt. %.

An elastic member was prepared in the same manner as in Example 1 except for using the adhesive prepared above, and the resultant elastic member was evaluated in the same manner as in Example 1.

As a result, good and uniform transfer performances were obtained in the initial stage. After the successive copying test of 200,000 sheets, a slight increase in resistance presumably attributable to peeling occurred, but the resultant image were not substantially affected.

Comparative Example 1

5 phr of electroconductive filler (Ketjen Black EC, mfd. by Lion-Akzo) was dispersed in a vulcanizable-type adhesive (Chemlok 250 mfd. by Lord Far East Co.) by means of a ball mill to prepare a vulcanizable-type electroconductive adhesive.

An elastic member was prepared in the same manner as in Example 1 except for using the adhesive prepared above, and the resultant elastic member was evaluated in the same manner as in Example 1.

As a result, in the successive copying test of 10,000 sheets, transfer failure due to partial increase in resistance based on peeling occurred.

EXAMPLE 4

15 phr of electroconductive filler (Ketjen Black EC, mfd. by Lion-Akzo) and 15 phr of terpenephenol resin (Sumilite Resin PR-12603, mfd. by Sumitomo Dules) were dispersed in 100 phr of SBR containing a toluene solvent (trade name: Nipol 1502, mfd. by Nihon Zeon) by means of a ball mill to prepare a rubber-type electroconductive adhesive having an electroconductive filler content of 20 wt. %.

An elastic member was prepared in the same manner as in Example 1 except for using the adhesive prepared above, and the resultant elastic member was evaluated in the same manner as in Example 1.

As a result, transfer performances similar to those obtained in Example 1 were obtained. After the successive copying test of 200,000 sheets, a slight increase in resistance presumably attributable to peeling between the semiconductive layer and metal core occurred, but the resultant image were not substantially affected.

EXAMPLE 5

20 phr of electroconductive filler (Ketjen Black EC, mfd. by Lion-Akzo) and 50 phr of a tackifier (Estergam, mfd. by Arakawa Kagaku) were dispersed in 100 phr of isoprene rubber containing a methyl ethyl ketone (MEK) solvent (Cariflex IR-305, mfd. by Shell Chemical) by means of a ball mill to prepare a rubber-type electroconductive adhesive having an electroconductive filler content of 15 wt. %.

An elastic member was prepared in the same manner as in Example 1 except for using the adhesive prepared above, and the resultant elastic member was evaluated in the same manner as in Example 1.

As a result, transfer performances similar to those obtained in Example 1 were obtained. After the successive copying test of 200,000 sheets, a slight increase in resistance presumably attributable to peeling between the semiconducting layer and metal core occurred, but the resultant image were not substantially affected.

Comparative Example 2

10 phr of electroconductive filler (Ketjen Black EC, mfd. by Lion-Akzo) and 1.5 phr of a vulcanizing agent comprising 2,5-dimethyl-2,5-di(t-butylperoxy)hexane (trade name: RC-4, 50% paste, mfd. by Toray Dow Corning Silicone K.K.) were dispersed in 100 phr of silicone rubber containing a toluene solvent SH-851 u mfd by Toray Dow Corning Silicone K.K.) by means of a ball mill to prepare a vulcanizable-type electroconductive adhesive.

An elastic member was prepared in the same manner as in Example 1 except for using the adhesive prepared above, and the resultant elastic member was evaluated in the same manner as in Example 1.

As a result, in the successive copying test of about 20,000 sheets, there occurred transfer failure due to partial increase in resistance due to on peeling at the interface between the semiconducting layer and metal core.

What is claimed is:

1. An elastic member for electrophotography comprising: an electroconductive substrate, and a semiconducting elastic layer bonded to the electroconductive substrate by a rubber-type electroconductive adhesive layer, said semiconducting elastic layer comprising a vulcanized rubber having an electroconductive filler dispersed therein, and said rubber-type adhesive layer comprising an unvulcanizable rubber having an electroconductive filler dispersed therein.

2. An elastic member according to claim 1, wherein the rubber-type electroconductive adhesive layer comprises a chloroprene rubber and 10-35 wt. % of carbon black as the electroconductive filler.

3. An elastic member according to claim 1, wherein the rubber-type electroconductive adhesive layer has a thickness of 0.5 micron-1 mm.

4. An elastic member according to claim 1, wherein the semiconducting elastic layer has a thickness of 0.5 mm-10 mm.

5. An electrophotographic apparatus comprising an electrophotographic photosensitive member and an elastic member disposed in contact with the photosensitive member, wherein the elastic member comprises an electroconductive substrate and a semiconducting elastic layer bonded to the electroconductive substrate by a rubber-type electroconductive adhesive layer, said semiconducting elastic layer comprising a vulcanized rubber having an electroconductive filler dispersed therein, and said rubber-type adhesive layer comprising an unvulcanizable rubber having an electroconductive filler dispersed therein.

6. An apparatus according to claim 5, wherein the rubber-type electroconductive adhesive layer comprises a chloroprene-type rubber and 10-35 wt. % of carbon black as the electroconductive filler.

7. A facsimile apparatus comprising an electrophotographic apparatus and receiving means for receiving image information from a remote terminal; said electrophotographic apparatus comprising an electrophotographic photosensitive member and an elastic member disposed in contact with the photosensitive member, wherein the elastic member comprises an electroconductive substrate and a semiconducting elastic layer bonded to the electroconductive substrate by a rubber-type electroconductive adhesive layer, said semiconducting elastic layer comprising a vulcanized rubber having an electroconductive filler dispersed therein, and said rubber-type adhesive layer comprising an unvulcanizable rubber having an electroconductive filler dispersed therein.

8. An apparatus according to claim 5, wherein the photosensitive member is charged by a voltage applied from said elastic member.

9. An apparatus according to claim 5, wherein said elastic member charges said photosensitive member to transfer a toner image on the photosensitive member onto a transfer material.

10. An apparatus according to claim 8 or 9, wherein the rubber electroconductive adhesive layer of said elastic member comprises a chloroprene rubber and 10-35 wt.% of carbon black as the electroconductive filler.

11. An apparatus according to claim 8 or 9, wherein the rubber electroconductive adhesive layer of said elastic member has a thickness of 0.5 micron-1 mm.

12. An apparatus according to claim 8 or 9 wherein the semiconducting elastic layer of said elastic member has a thickness of 0.5 mm-10 mm.

* * * * *

UNITED STATES PATENT AND TRADEMARK OFFICE
CERTIFICATE OF CORRECTION

PATENT NO. : 5,378,526

DATED : January 3, 1995

INVENTOR(S) : JUN MURATA

Page 1 of 2

It is certified that error appears in the above-identified patent and that said Letters Patent is hereby corrected as shown below:

<u>ON TITLE PAGE</u> : Column 2, line 6,

In [56] References Cited, under U.S. PATENT DOCUMENTS: "Horgen" should read --Horgan--.

<u>COLUMN 1</u>

Line 19, "adhesive" should read --adhesives--.
Line 20, "adhesive" should read --adhesives--.
Line 23, "effect" should read --affect--.
Line 31, "adhesive" should read --adhesives--.

<u>COLUMN 2</u>

Line 37, "layer" should read --layer.--.
Line 44, "thereof which can occur on" should be deleted.

<u>COLUMN 4</u>

Line 35, "kind" should read --kinds--.

<u>COLUMN 5</u>

Line 6, "addition" should read --added--.
Line 9, "bility" should read --ble--.
Line 11, "from" should read --for--.

<u>COLUMN 6</u>

Line 10, "to" should be deleted.

<u>COLUMN 8</u>

Line 6, "forming" should read --foaming--.

UNITED STATES PATENT AND TRADEMARK OFFICE
CERTIFICATE OF CORRECTION

PATENT NO. : 5,378,526
DATED : January 3, 1995
INVENTOR(S) : JUN MURATA

It is certified that error appears in the above-identified patent and that said Letters Patent is hereby corrected as shown below:

COLUMN 9

Line 41, "from" should be deleted.

COLUMN 10

Line 42, "image" should read --images--.
Line 60, "terpenephenol" should read --terpene-phenol--.

COLUMN 11

Line 8, "image were" should read --images were--.
Line 29, "image were" should read --images were--.
Line 51, "electrophotography" should read --electrophotography,--.

COLUMN 12

Line 25, "chloroprene-type" should read --chloroprene--.
Line 57, "9" should read --9,--.

Signed and Sealed this

Twenty-seventh Day of June, 1995

Attest:

BRUCE LEHMAN

Attesting Officer       Commissioner of Patents and Trademarks